Nov. 26, 1963 G. G. EDDY 3,111,923
CRAFT HULL FORM
Filed May 4, 1961
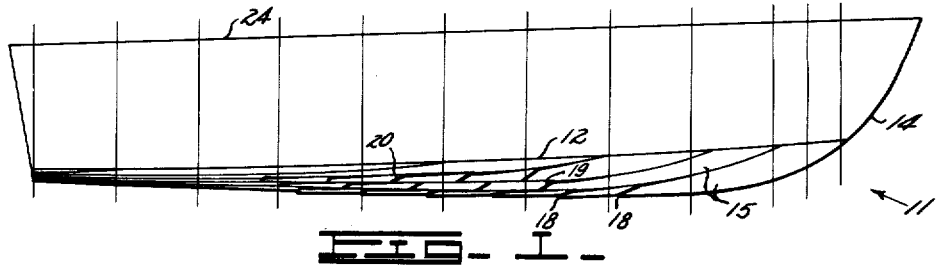
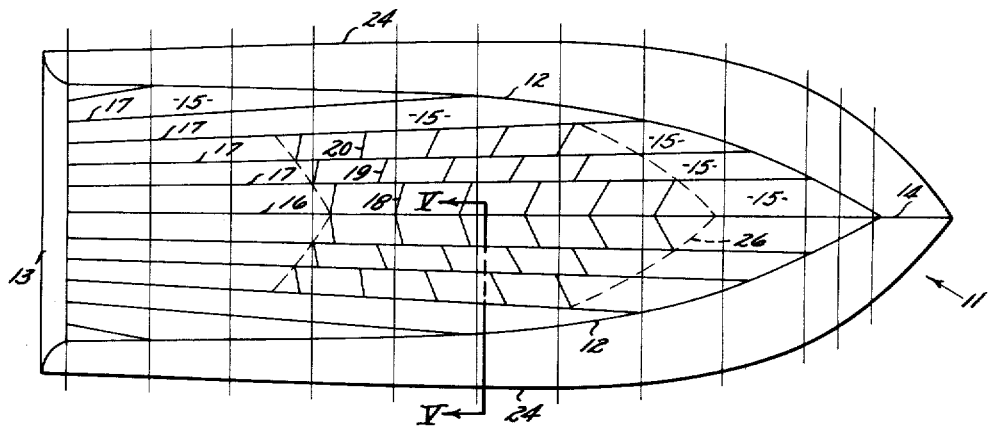
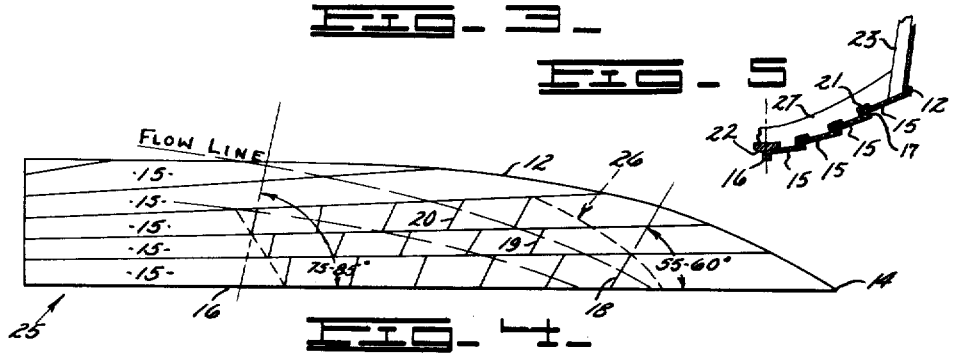
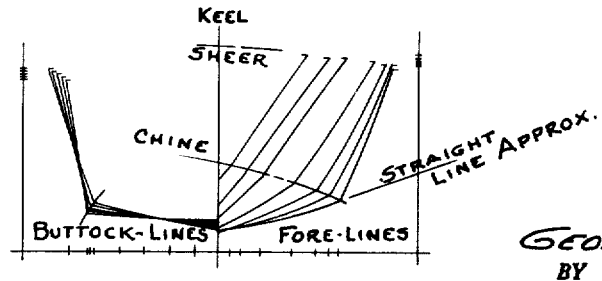
INVENTOR.
GEORGE G. EDDY
BY
ATTORNEYS .# United States Patent Office 3,111,923
Patented Nov. 26, 1963

3,111,923
CRAFT HULL FORM
George G. Eddy, Lakewood Blvd. at 112th,
Holland, Mich.
Filed May 4, 1961, Ser. No. 107,821
2 Claims. (Cl. 114—66.5)

The present invention is directed to a new and improved hull form for water craft and more particularly is directed to a unique form of hull sheathing which utilizes new contours and a wholly new system of hull surface upsets to provide a superior water craft having maximum stability at high speeds while minimizing wake turbulence and drag and providing good subsurface planing characteristics. The new hull reinforces the keel line and provides a hydraulic keel effect supplementing the structural keel. As a consequence of these innovations the presently described hull rides well in the water, thereby cushioning the craft against surface wave buffeting. The present hull combines aft facing with outward facing laps in a most unique manner.

Over the course of many years in the design of hulls I have evolved numerous hull innovations. In general, these innovations dealt with the development of a water contacting sheath having a plurality of "steps" or lapped planes so as to provide a substantial increase in apparent buoyancy during operation. During such development a study of the hydrodynamics of flow resulting from various hull surface upsets gave rise to various design advances. My United States Letters Patent 1,935,622, 2,039,585, 2,039,586, and 2,969,760 trace the evolution of this development. In my U.S. Letters Patent 2,960,957 I expressed newer concepts in overall hull contouring.

Where such hulls were adapted, as for example, to torpedo boats and the like, they proved very acceptable. In pleasure boating, the general construction expense and the reduced power plant required substantial revision in hull form so as to make available superior boating in pleasure craft while providing safety, stability, and a reduction of drag-effect influencing speed and buoyancy or planing under way. In the area of pleasure craft, considerations must be given to spaciousness or beam and variances in overall length and the effect of these variances in cost. Similarly, the innovation of extensive use of outboard power plants has required a reappraisal of overall hull form toward the obtention of optimum performance at relatively low construction costs. Thus, the present invention is concerned with a new and improved hull form wherein chine to keel form is expressed in combination with a novel surface upset accomplished by a wholly new pattern of lapping. Results of this form of hull include superior buoyancy under way, greater keel effect without mechanical extension of the keel, superior maneuverability, and good capacity and stability in a rough sea. Particularly adapted to the unusual water conditions of the Great Lakes, the present craft hull has proven unusually adaptable to the larger swell waters of the Atlantic and Pacific coast regions.

At relatively high speeds, the present hull form achieves a superior air-cushion effect in choppy water thereby reducing the hydraulic hammering at the hull experienced in smooth hulled craft. While this is the result sought after, for ease of ride, the boat builder is conscious that the character of the ride also reflects material reduction in friction as between hull and water and greatly assists in preparation of boat appointments since the constant shaking of the hull is greatly minimized.

General Description

In general, I provide a convex hull form in which the degree of convexity is increased as the hull approaches the keel and is diminished with flattening of curvature as the hull approaches the chines.

Symmetrical on either side of the keel and between keel and chines I provide a plurality of steps which progress fore to aft along plank planes which themselves are lapped in respect to their adjacent members. The lateral lapping progresses from keel to chines.

The plural steps progressing fore to aft are varied as to angle between projection of their lap to the keel. The included angle approaches 90 degrees as the steps approach the keel.

The plane pattern developed by the steps roughly resembles the fletching on an arrow and the keel flanking steps stop shortest of the stern of the craft while the outermost tiers of steps, closest the chines extend beyond the keel flanking steps toward the stern of the craft. This is in marked contrast to my previous findings wherein the entire subsurface was provided with surface interrupting plane overlaps. In the fore part of the hull, the keel flanking steps extend closest to the bow, while adjacent tiers of steps are furthest from the bow. Hence, the rough plane pattern of the steps proceeds rearwardly inset from the chines and in a roughly parallel arrangement to the chine line. The adjacent tiers, except for tiers on either side of the keel are provided with steps located on staggered centers to the steps on the next adjacent tier of steps.

Thus, the hull is provided with a plurality of aft facing edges or steps and a plurality of outward or chine facing edge or steps, the former in plural lines or tiers and the latter running the longitudinal length from chines to stern. The tiers progress in width from stern to bow. The step drops are of selected depth. In particular instances, this depth may be conveniently established by selection of plank thickness as dictated by considerations of specific usage and materials.

In operation, a hull so prepared was tested on 21 foot and 28 foot cruisers and provided excellent stability and resistance to roll and in motion with comparable power plants outperformed other hulls of conventional design. The enhanced performance was not only represented by additional speed for the same power plant, but in ease of ride in choppy water and increased maneuverability and stability on sharp turning. In straight line cruise motion, less drift from bearing appeared than experienced in boats of comparable length and power using conventional hull forms.

In the drawing:

FIGURE 1 is a side elevation view of a hull in accord with the present invention shorn of all superstructure at the sheer line.

FIGURE 2 is an end elevation projection from the grid stations shown in FIGURE 1 and showing buttock lines in the left half of the developments and bow lines in the right half.

FIGURE 3 is a bottom plan view of the hull form expressed in FIGURE 1 and showing the patterning of aft-faced steps and outward faced laps.

FIGURE 4 is a bottom plan view of one half of the hull form as located between the keel and chines.

FIGURE 5 is a section view taken on line V—V of FIGURE 3 and showing the out facing lap construction from keel to chine along the convex bottom curvature utilizing a straight line at the chine and increasing curvature to maximum at the keel.

Specific Description

Referring to the drawing and more particularly FIGURE 1 a hull 11 embodying the present invention is shown. Grid lines are provided over the hull 11 for ease in projection development and comprehension of the structure. The invention is primarily concerned with that portion of the hull 11 bounded by the chines 12, the stern 13 and the bow 14 at the chine lines 12. Within these bounds it will be seen that longitudinal plane curved surfaces, as generated by planks 15, are provided on either side of the keel 16 and the planks 15 are narrowest at the stern 13 and widen to contact with the chines 12. This is best appreciated by reference to FIGURES 3 and 4. The longitudinal planks 15 thus form tiers which are overlapped in outfacing edges 17. FIGURE 5 best illustrates the relationship of planks 15 to yield the outfacing steps or edges 17.

Each of the lapped tiers formed by planks 15, except the outermost tiers, are in turn provided with plural aft facing edges 18, 19 and 20 located in staggered relationship to each other and approaching perpendicularity to the keel 16. The bow-most of the aft-facing edges 18, 19 and 20 are at about 60 degree angles and the aft-most of the aft-facing edges projected to the keel are at an angle of between about 75 and 85 degrees. The angles herein referred to are the acute angles included as between the line of the aft-facing steps projected to the keel 16 and the keel 16. As is appreciated, this arrangement yields a compound edge effect which is a function of the outfaced edges, the aft-faced edges and the splayed width of planking 15.

The effects are complemented by an unusual configuration of the bottom surface of the craft taken along any specific cross section since the bottom is convex in form as between chines 12 and keel 16. The convexity is unique in that it does not constitute a simple curvalinear form but approximates a straight line form at the chine 12 and increases in convex curvature toward the keel 16. This accentuates the out-faced edges formed by the lapping of planks 15 as described, and is, of course, adjusted in degree in accord with design factors of load centers, beam, and horsepower or speed desired. The curvature from bow 14 to stern 13 along the keel 16 orients the transverse and aft-facing steps 18, 19 and 20 to intersect water flow at about right angles in accord with position.

The pattern formed by the aft faced edges 18, 19 and 20 is symmetrical about the keel 16 and is in the form of fletching as applied to arrows. The outer planks 15 carrying aft-faced edges 20 form the outer boundary of the pattern, the aft-faced edges 20 extending further toward the stern 13 and commencing closest to the midship region. The planks 15 adjacent the keel 16 carry aft-facing edges 18 which commence in the stern-midship region and extend therefrom substantially to the bow region. The outermost boundaries of the aft-faced edges 18, 19 and 20 roughly parallel and are indented from the chine lines 12. This develops a spade-like form or pattern of upsets and as shown in the drawing is effective where only a portion of the bottom is included, the aft-faced laps occupying only about ⅓ of the bottom surface and located to commence about ⅓ of the length of the keel 16 from bow 14 and extending rearwardly along the keel 16 for substantially ½ the length between bow 14 and transom 13.

By reference to FIGURE 5, the planks 15 are secured by rabbeted battens 21 and rest upon the apron 22 of the keel 16. The chines 12 support the outer planks 15. The battens 21, keel 16 and chines 12 are in turn supported by a box girder 23 and transverse spacer 27.

By reference to FIGURE 2, the development of the bottom curvature will be appreciated. The upper extremities of each of the lines terminates at the sheerline 24 as seen in FIGURES 1 and 3. The lower extremity of each of the profile lines terminates at the keel 16. A curve is generated as between the keel 16 and chines 12. These curves are thus shown in FIGURE 2 with buttock-lines on the left side of the FIGURE 2 and bow or fore-lines shown on the right. The curve is better appreciated in reference to FIGURE 5 as convex and with most of the convexity occuring at the keel 16. This unique configuration allows for maximum displacement in the region of the keel 16, thereby having a profound effect on matters of boat furnishing as influencing beam and weight-center criticality. In FIGURE 2, the overall curvature for each station is fully developed without regard to overlap.

In FIGURE 5, it will be seen that the external surface is generated by the plurality of lapped surfaces such as planks 15. The planks 15 diminish in width as they approach the keel 16 and are widest at the chines 12. Thus, the planks 15 may be regarded as a plurality of chordal distances, each imparting a variant degree of curvature, the one nearest the chine 12 approaching zero curvature and tangentially merging with the next adjacent flat plane step to generate a long radius convexity and progressing through successive planks 15 toward the keel 16, each having a shorter radius to provide a trace curve having maximum symmetric convexity at the keel region.

In FIGURE 4, the effective bottom 25 is shown on one side only of the keel 16 so as to illustrate the specific changes in angle, fore to aft, in the aft facing straight steps. These range from between about 55 to 60 degrees in the bow areas to between about 75 and 85 degrees in the stern areas so that the breaks in hull continuity are at substantially right angles to the water stream pattern as developed by the generated boundary layer of the pressure wave emanating from the locus or entry toward the aftward of the hull.

Operationally, as the craft is propelled from the stern, air is entrained as between the aft facing steps transverse of the keel and the edge effect as between out-faced surfaces and aft-faced surfaces quickly reduces surface contact with water until a substantial portion of the craft is floating on a constantly replenished air cushion so that skin friction is reduced and the hydraulic shock of wave impact is materially avoided. Reactant pressure patterns developed by the unique hull and bottom results in a keel buttressing effect tending to stabilize the structure and enhance maneuverability. Craft built in accord with the present structure produce a unique wake pattern which is substantially flatter than conventional wakes and which is heavily air laden thereby demonstrating a minimizing of displacement when the craft is underway. Craft employing this unique hull and bottom form ride well in the water and are extremely maneuverable while being resistant to roll or wallow. In addition, the described structure minimizes the development of a pressure wave. This develops more uniform pressure over the wetted areas of the hull at any planing condition. Further, the present design breaks any pressure wave prior to reaching the chines.

As will be appreciated, from the drawing, the pattern 26 of transverse laps (aft-faced) in staggered lines occupies only a portion of the effective bottom 25 in symmetric arrangement on either side of the keel 16, stopping short of the transom 13 and commencing rearwardly of the keel to chine contact in the bow 14. It will also be observed that the outer surfaces or planks 15 are now provided with aft-faced edges so that the pattern 26 of aft-faced edges generally parallels but is indented from the chines 12. Thus, the overall patterning 26 resembles a spade-like trace.

Quite obviously, the presently described hull form will be modified in accord with specifically designated craft dimensions and will be somewhat varied to meet design factors involving weight, weight centers, available horsepower, the use setting for the hull, beam to length ratios and deadrise factors. However, it is believed that the present hull form is adequately adaptable ranging from military and naval patrol craft to moderate sized power boats and up. There is every indication that the hull will have particular utility as a racing hull form.

Having thus described my invention, various modifications will occur to those skilled in the art and such modifications are intended to be included within the spirit of invention unless such inclusion lies outside the scope of the hereinafter appended claims.

I claim:

1. A planing hull form comprising: chines; a keel; a convex bottom provided between said chine lines and said keel; a bow portion extending from said keel; a longitudinally lapped outer surface of longitudinal members on said bottom having greatest convexity adjacent said keel and minimum convexity at said chines; planal steps provided in selected of said longitudinal members of said bottom and transverse thereof in staggered fashion to provide a substantially symmetrical spade pattern, on either side of said keel, said pattern occupying about ⅓ of said bottom surface and located commencing about ⅓ of the length of said keel from the bow and extending rearwardly along the keel for substantially ½ the length between bow and transom.

2. A bottom for water craft of the planing type having a bow, keel, and transom and chines comprising:

a. a plurality of continuous outward facing edges defined by lapped and compound curved planes longitudinally converging toward the transom;

b. A plurality of outwardly and rearwardly facing edges transverse to said continuous longitudinal edges and on selected of said plural planes, the forwardmost of said outwardly and rearwardly facing edges having an included angle with the keel of between about 55 and 60 degrees and increasing in included angle aftwise to between about 75 and 85 degrees; and c. a spade-like pattern in bottom plan view comprising said outwardly and rearwardly faced edges superimposed on said outward faced edges and said pattern occupying a total of said bottom of about one-half the length of said bottom between the chines, bow and transom commencing about one-third aft of the bow at the keel and said pattern terminating short of said transom.

References Cited in the file of this patent

UNITED STATES PATENTS

| | | |
|---|---|---|
| 1,223,320 | Curtiss | Apr. 17, 1917 |
| 1,933,598 | Parker | Nov. 7, 1933 |
| 2,634,698 | Becker | Apr. 14, 1953 |
| 2,969,760 | Eddy | Jan. 31, 1961 |

FOREIGN PATENTS

| | | |
|---|---|---|
| 345,455 | Great Britain | Mar. 26, 1931 |
| 765,565 | France | Mar. 26, 1934 |